United States Patent
Lensing et al.

(10) Patent No.: US 11,421,400 B2
(45) Date of Patent: Aug. 23, 2022

(54) MULTIPLE MODE OPERATIONAL SYSTEM AND METHOD WITH OBJECT DETECTION

(71) Applicant: DEERE & COMPANY, Moline, IL (US)

(72) Inventors: Keith J. Lensing, Asbury, IA (US); Brett S. Graham, Dubuque, IA (US); William W. Staidl, Hazel Green, WI (US)

(73) Assignee: Deere & Company, Moline, IL (US)

( * ) Notice: Subject to any disclaimer, the term of this patent is extended or adjusted under 35 U.S.C. 154(b) by 198 days.

(21) Appl. No.: 16/856,670

(22) Filed: Apr. 23, 2020

(65) Prior Publication Data

US 2021/0332558 A1 Oct. 28, 2021

(51) Int. Cl.
| | |
|---|---|
| *E02F 9/20* | (2006.01) |
| *E02F 9/02* | (2006.01) |
| *E02F 9/22* | (2006.01) |
| *E02F 9/26* | (2006.01) |
| *E02F 9/24* | (2006.01) |
| *B60R 1/00* | (2022.01) |
| *E02F 3/34* | (2006.01) |
| *E02F 3/28* | (2006.01) |
| *E02F 3/42* | (2006.01) |

(52) U.S. Cl.
CPC ............. *E02F 9/2033* (2013.01); *B60R 1/00* (2013.01); *E02F 3/422* (2013.01); *E02F 9/02* (2013.01); *E02F 9/2004* (2013.01); *E02F 9/2062* (2013.01); *E02F 9/2203* (2013.01); *E02F 9/2246* (2013.01); *E02F 9/24* (2013.01); *E02F 9/26* (2013.01); *B60R 2300/8093* (2013.01); *E02F 3/283* (2013.01); *E02F 3/3414* (2013.01)

(58) Field of Classification Search
CPC ......... E02F 3/283; E02F 3/3414; E02F 3/422; E02F 9/02; E02F 9/2004; E02F 9/2033; E02F 9/2062; E02F 9/2203; E02F 9/2235; E02F 9/2246; E02F 9/24; E02F 9/26; E02F 9/262; B60R 1/00; B60R 2300/8093
See application file for complete search history.

(56) References Cited

U.S. PATENT DOCUMENTS

| | | | |
|---|---|---|---|
| 7,233,853 B2 | 6/2007 | Hendron et al. | |
| 7,823,897 B2 | 11/2010 | Kelly et al. | |
| 7,984,574 B2 | 7/2011 | Pfohl et al. | |
| 9,457,841 B2 | 10/2016 | Smith et al. | |
| 9,663,921 B2 * | 5/2017 | Wei | E02F 9/2054 |
| 9,885,169 B2 * | 2/2018 | Sharpe | E02F 9/262 |
| 9,989,636 B2 | 6/2018 | Sherlock | |

(Continued)

*Primary Examiner* — Tyler J Lee (57) ABSTRACT

A multiple mode operational system for a work machine may comprise a frame, a ground-engaging mechanism coupled to the frame, an attachment, an object detector, and a multiple mode control system. The multiple mode control system may include a control device and a controller receiving a signal from the control device. The controller may have a first operational mode and a second operational mode. The first operational mode may enable a first sensitivity response to the control device and the second operational mode may enable a second sensitivity response to the control device. The controller may be configured to receive an object signal from the object detector and modify the operational mode of the controller based on a detected distance of the object from a reference point.

17 Claims, 5 Drawing Sheets

(56) References Cited

U.S. PATENT DOCUMENTS

| | | | |
|---|---|---|---|
| 10,527,731 B2* | 1/2020 | Kinoshita | E02F 9/2033 |
| 10,954,655 B2* | 3/2021 | Ohiwa | E02F 9/26 |
| 10,961,685 B2* | 3/2021 | Ono | B60K 25/04 |
| 11,001,988 B2* | 5/2021 | Gentle | E02F 9/2033 |
| 2004/0195022 A1* | 10/2004 | Inoue | B60K 31/0008 |
| | | | 180/170 |
| 2008/0083578 A1 | 4/2008 | Kelly et al. | |
| 2012/0096843 A1* | 4/2012 | Hennemann | E02F 9/2066 |
| | | | 60/327 |
| 2013/0255977 A1* | 10/2013 | Braunstein | E02F 3/765 |
| | | | 172/4.5 |
| 2016/0037707 A1 | 2/2016 | Bebernes et al. | |
| 2018/0030687 A1 | 2/2018 | Fleischmann | |
| 2019/0005727 A1* | 1/2019 | Tanaka | G06K 9/00798 |
| 2020/0041999 A1 | 2/2020 | Pfaff | |
| 2020/0302657 A1* | 9/2020 | Shimazu | H04N 7/18 |

\* cited by examiner

MULTIPLE MODE OPERATIONAL SYSTEM AND METHOD WITH OBJECT DETECTION

CROSS-REFERENCE TO RELATED APPLICATIONS

N/A

FIELD OF THE DISCLOSURE

The present disclosure relates to a multiple mode operational system and method with object detection for a work machine.

BACKGROUND

Work machines, including crawler dozers, loaders, excavators, utility work machines, tractors, and road pavers, to name a few, are generally work machines comprising an attachment coupled to a boom that can be manipulated to perform a variety of functions. One of the challenges in the use of work machines are the myriad of environments the work machine may function. In one exemplary scenario, the work machine may move across wide open spaces, such as uncultivated land, fallowed land, or virgin timber land, constructing new projects on the open spaces. The work machine may then travel between the open space and a congested space such as a storage lot or shed housing material to be distributed in the open space. Alternatively, the work machine may work in an urban environment with the machine maneuvering between existing structures. Compact track loaders, for example, can be used to transport material and/or to perform a variety of tasks with attachment. When work machines, may approach the work machine in close proximity.

The discussion above is merely provided for general background information and is not intended to be used as an aid in determining the scope of the claimed subject matter.

SUMMARY

This summary is provided to introduce a selection of concepts that are further described below in the detailed description and accompanying drawings. These and other features will become apparent from the following detailed description and accompanying drawings, wherein various features are shown and described by way of illustration.

A multiple mode operational system for a work machine is presented. The system comprises a frame, a ground-engaging mechanism coupled to the frame, an attachment, an object detector, and a multiple mode control system. The multiple mode control system includes a control device and a controller for receiving an input signal from the control device. The controller may have a first operational mode and a second operational mode. The first operational mode may enable a first sensitivity response to the control device. The second operational mode may enable a second sensitivity response to the control device. The controller may be configured to receive an object signal from the object detector and modify an operational mode of the controller based on a detected distance of the detected object from a reference point.

The control device may comprise one or more of a joystick, a foot pedal, a touchscreen, and a steering wheel.

The multiple mode operational system may further comprise a valve in fluid communication with a plurality of hydraulic actuators coupled to the ground-engaging mechanism. A pump may be configured to discharge fluid to the valve, wherein the operational mode is altered by the controller modifying a margin pressure value. The pump discharging fluid to the valve may based on a current margin pressure value and an input signal from the control device.

The multiple mode operational system may further comprise a valve in fluid communication with a plurality of hydraulic actuators coupled to the attachment to move the attachment from a first position to a second position. A pump may be configured to discharge fluid to the valve, wherein the operational mode is altered by the controller modifying a margin pressure value. The pump discharging fluid to the valve may be based on a current margin pressure value and an input signal from the control device.

The multiple mode operational system may further comprise a power source, a power conversion system driven by the power source to power one or more of the ground-engaging mechanism for moving the frame, and the attachment. The operational mode may be modified by the controller by modifying the power conversion system from a first power-to-torque ratio to a second power-to-torque ratio.

The multiple mode operational system may further comprise a display supported on the frame and configured to output an image based on the object signal from the object detector, wherein the object detector comprises an image capturing system.

The multiple mode operational system may further comprise a light sensor configured to differentiate between sunlight and artificial light wherein the controller receives a light signal from the light sensor and alters the operational mode of the controller based on the light signal from the light sensor.

The controller may modify the operational mode based on a threshold distance of the detected object from the reference point. The threshold distance of the detected object from the object detector may be modified based on the operational mode.

The multiple mode operation system may further comprise an alert signal activated upon detection of the object within a threshold distance, wherein the threshold distance is modified based on operational mode.

The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As used herein, the term "controller" is a computing device including a processor and a memory. The "controller" may be a single device or alternatively multiple devices. The controller may further refer to any hardware, software, firmware, electronic control component, processing logic, processing device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
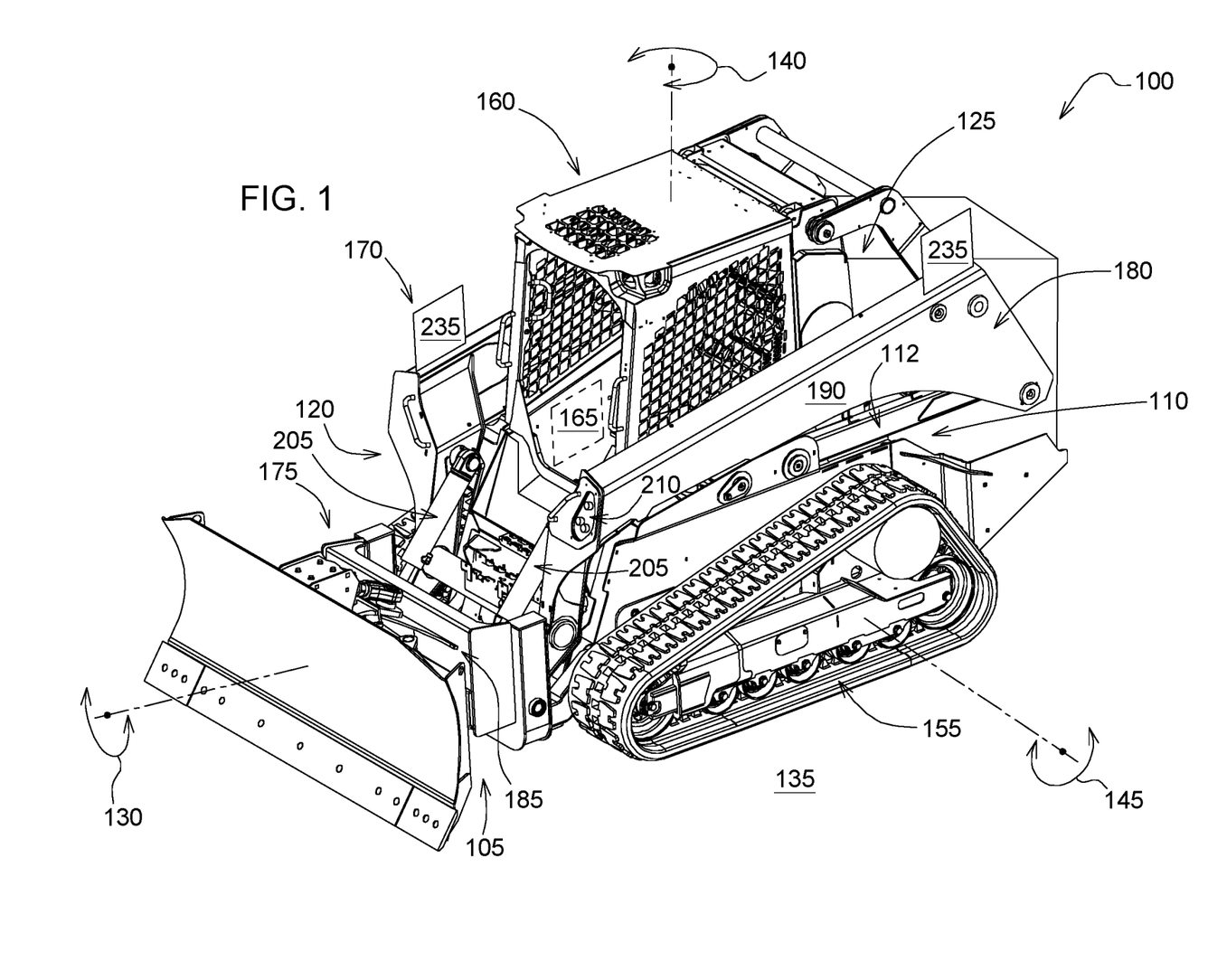
FIG. 1 is a perspective view of an exemplary embodiment, a compact track loader.

FIG. 1 illustrates a work machine 100 depicted as a compact track loader with an attachment 105 operatively coupled to the work machine 100. It should be understood, however, that the work machine could be one of many types of work machines, including, and without limitation, a skid steer, a backhoe loader, a front loader, a bulldozer, a tractor, a baler, a sprayer, and other construction or agricultural work machines. The work machine 100 as shown, has a frame 110, having a front-end section 120, or portion, and a rear-end section, or portion 125. The work machine 100 includes a ground-engaging mechanism 155 that supports the frame 110 and an operator cab 160 supported on the frame 110, the ground-engaging mechanism 155 configured to support the frame 110 on a surface 135.

The power source 165 is coupled to the frame 110 and is operable to move the work machine 100. The illustrated work machine 100 includes tracks, but other embodiments may include one or more wheels that engage the surface 135. Work machine 100 may be operated to engage the surface 135 and cut, move, lift, and carry material to achieve simple or complex features on the surface, or harvesting resources. In this exemplary embodiment, the ground-engaging mechanism 155 on the left side of the work machine 100 may be operated at a different speed, or in a different direction, from the ground-engaging mechanism 155 on the right side of the work machine 100. However, this is not required in other work machines such as tractors where an articulating joint may assist in turning. In a conventional compact track loader, the operator can manipulate controls from inside an operator cab 160 to drive the tracks on the right or left side of the work machine 100 using a control device. The movement for the work machine 100 and the attachment 105 coupled to the work machine 100 may be referred to as roll 130 or the roll direction, pitch 145 or the pitch direction, and yaw 140 or the yaw direction.

The work machine 100 comprises a boom assembly 170 coupled to the frame 110. An attachment 105, or work tool, may be pivotally coupled at a forward portion 175 of the boom assembly 170, while a rear portion 180 of the boom assembly 170 is pivotally coupled to the frame 110. The frame 110 comprises a mainframe 112 and a portion coupled to the ground engaging mechanism 155 such as a track frame (alternative embodiments comprising other work machines may have other ground-engaging mechanisms such as wheels). The attachment 105 may be coupled to the boom assembly 170 through an attachment coupler 185. One exemplary attachment coupler 185, often referred to as Deere and Company's Quik-Tatch, is an industry standard configuration and a coupler universally applicable to many Deere attachments and several after-market attachments. The attachment coupler 185 may be coupled to a distal section of the boom arms 190, or more specifically the forward portion of the boom assembly 170.

The boom assembly 170, of the exemplary embodiment, comprises a first pair of boom arms 190 (one each on a left side and a right side) pivotally coupled to the frame 110 and moveable relative to the frame 110 by a pair of boom hydraulic actuators 195 (shown in FIG. 3), wherein the pair of boom hydraulic actuators 195 may also conventionally be referred to as a pair of lift cylinders (one coupled to each boom arm) for a compact track loader. The attachment coupler 185 may be coupled to a forward section, or portion, of the pair of boom arms 190, being moveable relative to the frame 110 by a pair of tilt hydraulic cylinders 205 (shown in FIG. 3). The frame 110 of the work machine 100 further comprises a hydraulic coupler 210 (shown in FIG. 3) on the front-end portion 120 of the work machine 100 to couple one or more auxiliary hydraulic cylinders to drive movement of or actuate auxiliary functions of an attachment 105. The attachment coupler 185 enables the mechanical coupling of the attachment 105 to the frame 110. The hydraulic coupler 210, contrary to the attachment coupler 185, enables the hydraulic coupling of an auxiliary hydraulic actuators(s) 215 on the attachment 105 to the hydraulic circuit 330 (shown in FIG. 2) of the work machine 100. Please note that not all attachments have one or more auxiliary hydraulic cylinders and therefore will not use the hydraulic coupler 210. Alternatively, uses for the hydraulic coupler 210 include opening or closing a grapple type attachment, or spinning a roller brush type attachment. In the embodiment described in detail below, the hydraulic coupler 210 is used in conjunction with an attachment 105, the attachment in the embodiment shown in FIG. 1 comprises a blade 322. Other attachments may include a bucket, sprayer, tilling attachments, etc.

Each of the pair of boom hydraulic actuators 195, the pair of tilt hydraulic actuators 205, and the auxiliary actuators 215 (found on the attachments of embodiments shown herein) are double acting hydraulic actuators. As would be understood by one of ordinary skill in the art, one end of each actuator may be referred to as a head end, and the end of each actuator opposite the head end may be referred to as a rod end. Each of the head end and the rod end may be fixedly coupled to another component, such as a pin-bushing or pin-bearing coupling, to name but two examples of pivotal connections. As a double acting hydraulic actuator, each may exert a force in the extending or retracting direction. Directing pressurized hydraulic fluid 336 into a head chamber of the actuators will tend to exert a force in the extending direction, while directing pressurized hydraulic fluid 336 (shown in FIG. 3) into a rod chamber of the actuators will tend to exert a force in the retracting direction. The head chamber and the rod chamber may both be located within a barrel of the hydraulic actuator and may both be part of a larger cavity which is separated by a moveable piston connected to a rod of the hydraulic actuator. The volumes of each of the head chamber and the rod chamber change with movement of the piston, while movement of the piston results in extension or retraction of the hydraulic actuator. The controller of these actuators will be described in further detail with regards to FIG. 2. These actuators (195, 205, 215) can be as described above or any other type of hydraulic actuator known to one of ordinary skill in the art.

Figure 2:
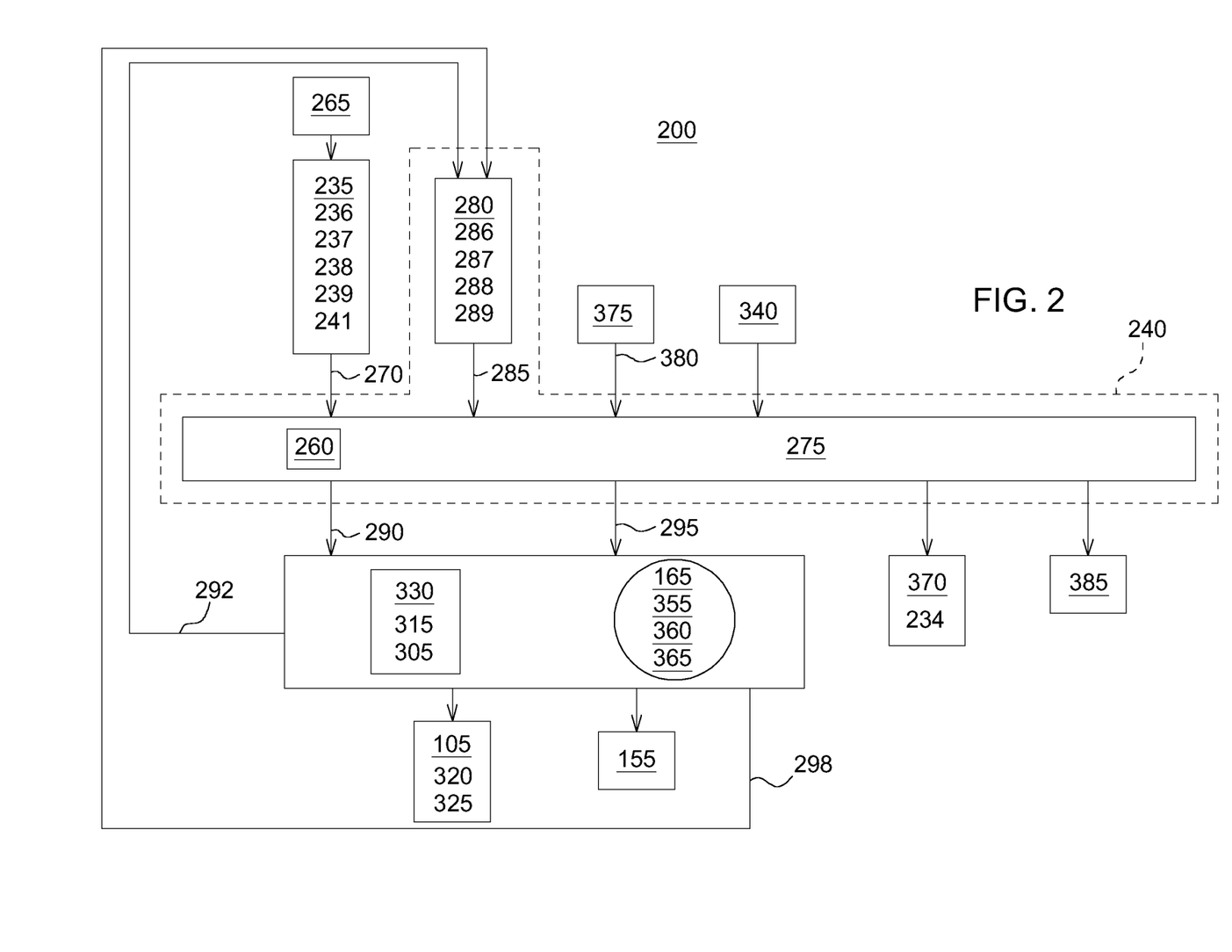
FIG. 2 is a schematic of the multiple mode operational system for a work machine.
Figure 4:
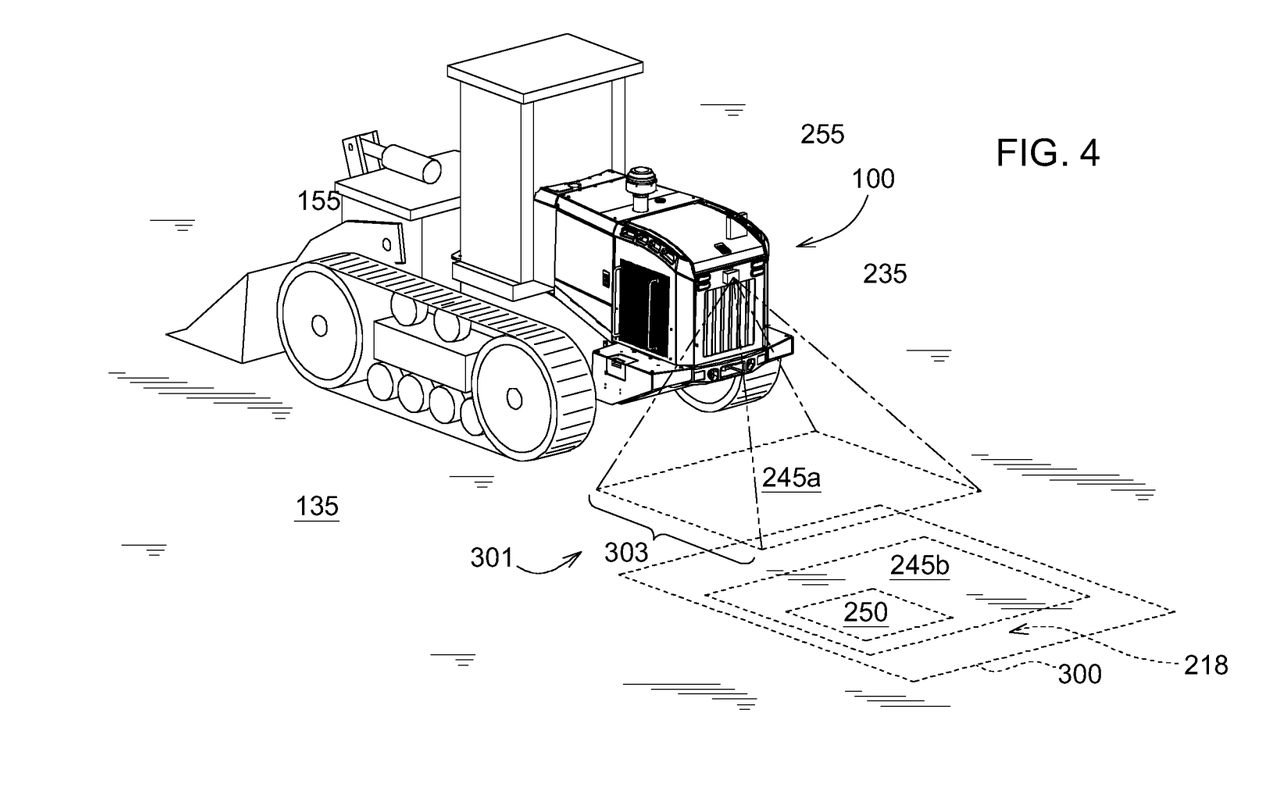
FIG. 4 is an exemplary embodiment demonstrating a work machine with a multiple mode operational system, demonstrating distance thresholds.

The multiple mode operational system 200 shown in FIG. 2, with reference to FIGS. 1 and 4, the system may comprise a frame 110, a ground-engaging mechanism 155 coupled to the frame 110, an attachment 105 coupled to the frame, an object detector 235 coupled to the frame 110, and a multiple mode control system 240. The object detector 235 may be configured to detect an object around the work machine 100. The object detector 235 may give a line-of-sight to the ground and objects around the work machine 100. The object detector 235 may be utilized to detect objects within a certain detection distance 300 of the work machine 100. In one embodiment, the detection distance 300 may be determined by the capabilities of the object detector 235. The object detector 235 may comprise of a radar 236 to sense objects located around the work machine 100 in the area, and other sensing technologies, including laser 237 (e.g. lidar), sound 238 (e.g. ultrasound/sonar), image capture 239 (e.g. one or more cameras), and FLIR thermal imaging systems 241. In normal operation, the object detector 235 may be configured to detect an object closer than a threshold distance (245a, 245b) from either the work machine 100 or the object detector 235 itself. The threshold distance (245a, 245b) may be pre-set or adjustable to avoid the ground surface 135 setting off the object detector 235. Object detector 235 may also be configured to require a detected object be larger than a threshold size 250 before being considered an object, and this threshold size 250 may be pre-set or adjustable, based on the distance to the object from a reference point 255. In one exemplary embodiment, the reference point 255 may be a portion of the work machine 100, such as the frame 110, the boom assembly 170, or the attachment 105. Alternatively, the reference point may be a point where the ground-engaging mechanism 155 engages the ground surface 135. In yet another alternative embodiment, the reference point 255 may the object detector 235 itself, or a receiving counterpart to the object detector 235.

Object detectors 235 may include a processor 260 that analyzes the sensed input 265 to determine whether an object is present in the area and then communicates an object signal 270 indicative of the presence of an object in the area to the controller 275. In one exemplary embodiment, the object signal 270 from the object detector 235 may be a value which indicates the absence of an object (e.g. 0) or the proximity of the object to the object detector 235 (e.g. 1, 2, or 3 as the proximity increases). In alternative embodiments, the object signal 270 from the object detector 235 may not itself communicate the presence or absence of an object in an area but may instead communicate a value representative of the signal strength. In another embodiment, the object signal 270 may be derived from the dimensional attributes of an image where a distance and/or size of an object may be calculated based on a known reference point 255 by the processor 260. In yet other alternative embodiments, the object detector 235 may communicate other data to controller 275, or data in an alternative format, to allow the controller 275 to determine whether an object is present in the area. Object detector 235 may communicate further information such as the size of, distance to, or movement of the detected object, to enable the controller 275 to take different actions based on the size, distance, or movement the detected object.

The multiple mode operational system 200 further comprises a multiple mode control system 240 that may couple to or include a control device 280, and a controller 275 receiving an input signal 285 from the control device 280. The control device 280 may comprise one or more of joystick 286, a foot pedal 287, a touchscreen 288, and a steering wheel 289.

The controller 275 may comprise at least a first operational mode 290 and second operational mode 295. In yet other alternative embodiments, several operational modes may exist depending on the granularity of control of the work machine 100, and requirements based on several worksite parameters and work machine applications. The first operational mode 290 may enable a first sensitivity response 292 to the control device 280. The second operational mode 295 may enable a second sensitivity response 298 to the control device 280. The controller 275 may be configured to receive the object signal 270 from the object detector 235 and modify the operational mode (292, 298) of the controller 275 based on a detected distance 300 of the object from a reference point 255. As shown in FIG. 4, the threshold distance (245a, 245b) from reference point 255 may be a reference line 301, for example, or alternatively, the threshold distance 245 from a reference point 255 may be a reference range 303.

The multiple mode operational system 200 may further comprise a valve, as part of the hydraulic circuit 330, in fluid communication with a plurality of hydraulic actuators (195, 205, 215) coupled to the ground-engaging mechanism 155, and a pump 310 configured to discharge fluid 336 to the valve 305, wherein the operational mode (290, 295) may be altered by the controller 275 by modifying a margin pressure value 315. The pump 310 may discharge fluid 336 to the valve 305 based on the margin pressure value 315 and the input signal 285 from the control device 280.

Figure 3:
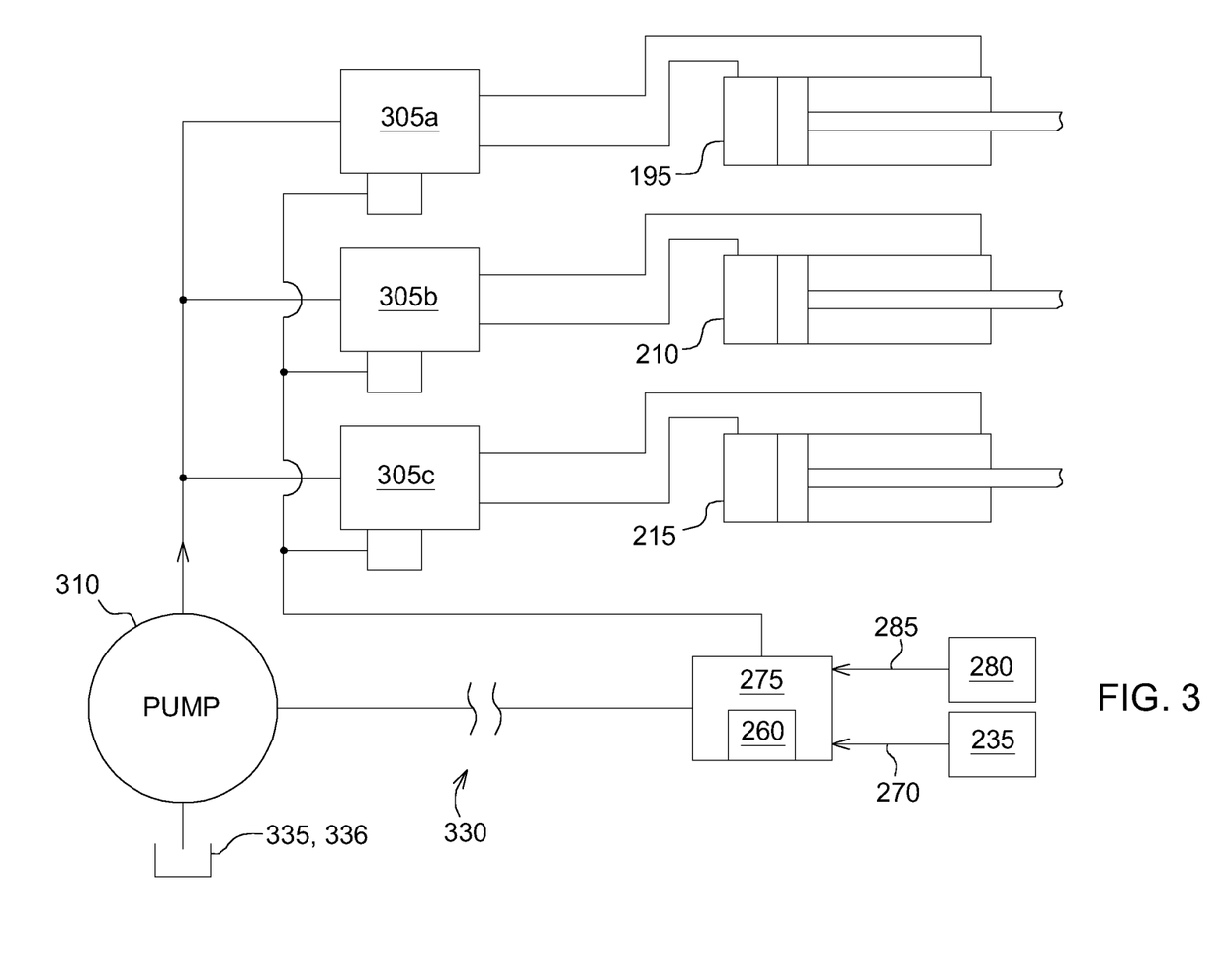
FIG. 3 is a partial schematic of an exemplary embodiment of a hydraulic circuit configured to supply fluid to a work machine and/or attachment.

Similarly, a valve 305 (305a, 305b, 305c for this embodiment, collectively referred to as 305) may be in fluid communication with a plurality of hydraulic actuators (195, 205, 215 in the embodiment shown) coupled to the attachment 105 to move the attachment 105 from a first position 320 to a second position 325. Again, the pump 310 may discharge fluid to the valve 305 based on the margin pressure value 315 and the input signal 285 from the control device 280. FIG. 3 is a partial schematic of an exemplary embodiment of a hydraulic system 330 configured to supply fluid 336 to a work machine 100. A basic layout of a portion of the hydraulic system 330 is shown for clarity and one of ordinary skill in the art will understand that different hydraulic, mechanical, and electrical components can be used depending on the work machine 100 and the moveable attachments 105. The hydraulic system 330 includes a pump 310 that receives fluid 336 from a reservoir 335 and supplies fluid to one or more downstream components. For example, the pump 310 is in fluid communication with one or more valves and each valve is in fluid communication with at least one actuator. The controller 275 is coupled to the pump 310, and the object detector 235, and is configured to adjust the pump output 310 based on one or more inputs (e.g. the object signal 270 and the input signal 285. The controller 275 can be configured to compensate for the margin pressure value 315. The controller 275 can instruct the pump 310 to deliver extra pressure above the required load pressure 340 referred to as the margin pressure value 315. A load pressure 340 may be the pressure required to move an attachment 105 from a first position 320 to a second position 325 (variable depending on the payload carried), or the pressure required to move the ground-engaging mechanism 155, in response to the control device 280. The margin pressure value 315 can be based, for example, on the pressure loss through the system, or an estimated pressure loss. The pressure can also be used to assist in controlling the delivery rate of the pump 310 to speed or slow the response to accommodate a pressure change or excess pressure command.

The controller 275 can obtain the margin pressure value 315 in several ways. For example, the margin pressure can be: a predetermined value that is built into the controller 275, stored in memory, or received from a lookup table containing different values based on different operating parameters of the work machine 100; a measured value 350 that fluctuates based on the use of components in the hydraulic system and/or external influences, such as the object signal 270, or a combination of both.

The exemplary embodiment in FIG. 3 shows three valves (305a, 305b, 305c), three hydraulic actuators (195, 210, 215), and an object detector 235, although any number of valves, hydraulic actuators, and object detectors 235 can be used. A one-to-one relationship is shown for the valves to the hydraulic actuators, but more than one valve can be associated with each actuator, as would be understood by one of ordinary skill in the art. The pump 310 is configured to discharge fluid 336 to the valves 305. The rate of fluid 336 discharged from the pump 310 adjusts the pressure of the fluid supplied to the valves and the hydraulic actuators. The pump 310 can be capable of providing an adjustable output, for example a variable displacement pump or variable delivery pump, that is controlled based on a signal from the controller. A fixed displacement pump can also be used with different relief or unloading valves to effectively create a variable output. The pump receives fluid 336, for example hydraulic oil, from the reservoir 335 and discharges fluid 336 at the requested flow rate to create a desired system pressure for either to move the attachment from a first position to a second position, and alternatively or including, to control movement of the ground-engaging mechanism 155.

The type of valve 305 can depend on the actuators and the type of work machine. Each valve 305 can be coupled to a hydraulic line to receive fluid 336 from the pump 310 and one or more hydraulic lines to send fluid 336 to one or more hydraulic actuators. The valves 305, shown in FIG. 3, can be configured to receive an input signal 285 from the controller 275 and/or one or more control devices 280 to selectively supply fluid 336 to the actuators based on a user's commands. A basic schematic of the valves is shown for clarity and one of ordinary skill in the art will understand that the valves can comprise of one or more different types of valves, sensors, comparators, switches, regulators, and other hydraulic components including spools, check valves, solenoids, etc., that are controlled by various hydraulic, mechanical, or electric signals.

The multiple mode operational mode 200 may further comprise a power source 165, and a power conversion system 355 driven by the power source 165 to power one or more of the ground-engaging mechanism 155 for moving the frame 110 and the attachment 105, wherein the operational mode (290, 295) is altered by the controller 275 by modifying the power conversion system 355 from a first power-to-torque ratio 360 to a second power-to-torque ratio 365. In an exemplary embodiment, a calculation is performed using the object signal 270 and an increase or decrease in speed request (a component of an input signal 285) from a control device 280.

Different operations can require different movement speeds. For example, certain operations, such as digging near a pipe, require precision of fine control over the movement of an attachment or the speed at which the work machine 100 is moving over the ground surface. As such, a high resolution of movement rates of the respective components (boom assembly 170, attachment 105) would be desired. In another example, such as moving dirt to a truck for removal, it is desired to provide a higher rate of movement of the components of the work machine 100 to reduce cycle times. As such, a lower resolution or gross resolution of movement rates would be desired. Accordingly, modifying an operational mode, for example, may include a first operational mode 290 (e.g. a slow, precision mode that reduces movement speed of the attachment 105 and ground-engaging mechanism 155 in response to an input signal 285, or also referred to as a first sensitivity response 292) and a second operational mode 295 (e.g. a fast, or productivity mode, that increases the movement speed of the attachment 105 and ground-engaging mechanism 155 in response to an input signal 285, or also referred to as the second sensitivity response 298). Depending on the hydraulic circuit 330, changes in the margin pressure value 315 may change the sensitivity response (292, 298) of the control device 280 for either one or more of the attachment 105 and ground-engaging mechanism 155.

For example, the controller 275 may have two discrete operational modes (290, 295) or sensitivities (192, 198), a first setting corresponding to normal operation (gain=1) and a second setting corresponding to slow or precision operation gain (gain<1) in response to the control device 280. In various exemplary embodiments, the controller 275 has a plurality of settings or has a variable gain, such as in the case of an infinitely adjustable control device.

In various exemplary embodiments, the first operational mode 290 can be in the range of approximately 20% to approximately 100% of the speed of the normal mode, although the slow mode can be configured down to just above 0% of the normal mode if needed. In various exemplary embodiments, the first operational mode 290 can be approximately 50% or approximately 55% of the speed of the normal mode. In various exemplary embodiments, the second operational mode can be in a range of approximately 100% to approximately 200% of the normal mode.

The multiple mode operational system 200 may further comprise a display 370 supported on the frame 110 and configured to output an image captured by the object detector 235, wherein the object detector 235 comprises an image capturing system 239. In various exemplary embodiments the fast mode is approximately 120% or approximately 130% of the speed of the normal mode. In various exemplary embodiments the amount of speed adjustment can be selected by a user up to approximately 200% of the normal mode. The reduction of movement speed and reduction of margin pressure value 315 can vary depending on the system. As such, the reduction in movement speed and the reduction in margin pressure value 315 are not necessarily linear, i.e. a 50% reduction of speed does not necessarily equal a 50% reduction in the margin pressure. By altering the margin pressure value 315, the system can effectively reduce or increase the movement speed of one or more of the ground-engaging mechanism 155 and attachment 105 without the use of complex electro-hydraulic valves.

The multiple mode operational system 200 may further comprise a light sensor 375 configured to differentiate between sunlight and artificial light, or alternatively detect light based on wavelength. The controller may be configured to receive a light signal 380 from the light sensor 375 and modify the operational mode (290, 295) of the controller 275 based on the light signal 380 from the light sensor 375. Use of wavelength information may provide the work machine 100 information indicative of work site information and/or daylight information. For example, the light signal 280 may be indicative of working indoors in a congested space. Alternatively, the light signal 280 may be indicative of working outdoors in an open space. The light signal 280 may further provide input to the controller for interpreting the object signal 270 (in particular the image capturing system 230) for interpreting images in object detection. For example, an object at dawn may appear different in an image that at mid-day or at dusk, and alternatively, an object may appear different in an image indoors versus outdoors.

The threshold distance (245a, 245b) of the detected distance from a reference point 255 may be modified based on the operational mode (290, 295) from a first threshold distance (245a) to a second threshold distance (245b). The threshold distance (245a, 245b) modification may differ of when the operational mode (290, 295) changes from a first sensitivity response 292 to a second sensitivity response 298, or in reverse, from a second sensitivity response 298 to a first sensitivity response 292, or the change can be the same fluctuating the threshold distance between two fixed areas, or lines. For example, when in the second operational mode 295, the system 200 may be operating with an increased granularity, or at a different response curve, to better suit worksite conditions (a congested space), where the threshold distance is closer to the machine 245a. When the work machine 100 enters a worksite where the first operational mode 290 is optimal (e.g. wide open fields), the threshold distance 245b may be greater than the threshold distance 245a when the work machine enters the first operational mode 290. That is, the threshold distance 245 when this occurs may differ from entering an open space from a congested space, or vice versa. FIG. 4 demonstrates this change in threshold distance. There may be at least two threshold distances (245a, 245b) corresponding to their respective operational modes (295, 290). Alternatively, the system 200 may have three or more threshold settings depending on the type of work machine 100. The multiple mode operation system 200 may further comprise an alert signal 385 activated upon detection of the object within a threshold distance 245.

Figure 5:
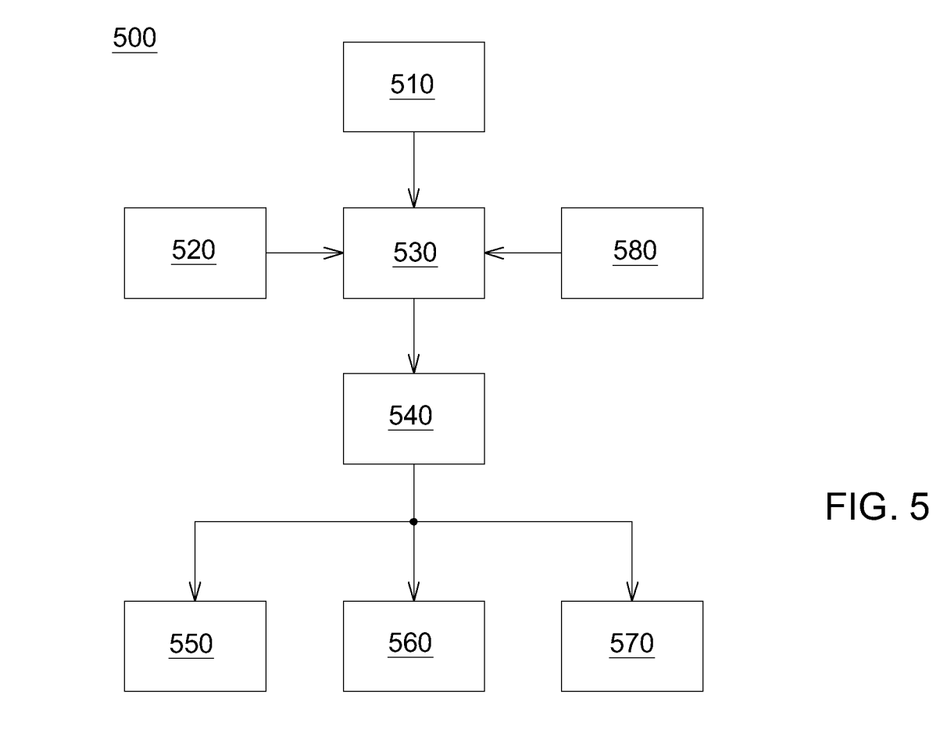
FIG. 5 is a flowchart of a method for dynamically shifting the operational mode of work machine.

FIG. 5 is a flowchart illustrating a method 500 for dynamically shifting an operational mode (290, 295) for a work machine. In step 510, the controller 275 may receive an object signal 270 from an object detector 235. The object detector 235 may be configured to detect an object around the work machine 100.

In step 520, the controller 275 may receive an input signal 285 from a control device 280.

In step 530, the controller 275 may determine the detected distance of a detected object from a reference point 255 based on the object signal 270.

In step 540, the controller 275 may modify an operational mode (290, 295) based on the detected distance 300 of the detected object. As previously described, the controller 275 may comprise a first operational mode 290 and a second operational mode 295. The first operational mode 290 may enable a first sensitivity response 292 to the input signal 285 from the control device 280. The second operational mode 295 may enable a second sensitivity 298 response to the input signal 285 from the control device 280. The control device 280 may comprise one or more of a joystick 286, a foot pedal 287, a touchscreen 288, and a steering wheel 289. The controller 275 modifies the operational mode (290, 295) based on an object crossing or, alternatively being within threshold distance 245 of the detected object from the reference point 255. The threshold distance 245 of the detected object from the object detector 235 may further be modified based on the operational mode (290, 295).

Based on the operational mode, in step 550, the controller 275 may receive a current margin pressure value 315 and modify the margin pressure value 315 by discharging fluid 336 by a pump 335 to a valve 305 in fluid communication with a plurality of hydraulic actuators coupled to the ground-engaging mechanism 255 of the operational mode (290, 295). Alternatively, the controller 275 may modify a margin pressure value 315 by discharging fluid 336 by a pump 335 to a valve 305 in fluid communication with a plurality of hydraulic actuators (195, 210, 215) coupled to an attachment to move the attachment from a first position to a second position.

In step 560, based on the operational mode (290, 295), the controller 275 may receive a first power-to-torque ratio 360 on a power conversion system 355 and modify the power conversion system to a second power-to-torque ratio 365. The power conversion system 355 may be driven by a power source 165 to power either or both of a ground-engaging mechanism 155 for moving a frame 110 of the work machine 100 and an attachment 105 coupled to the work machine 100.

In step 570, the controller 275 may output an image onto a display 370 based on the object signal 270 from the object detector 235, when the object detector 235 comprises an image capturing system 239.

In step 580, the controller 275 may receive a light signal 380 from a light sensor 375, and modify the operational mode (290, 295) based on the light signal 380 from the light sensor 375.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A multiple mode operational system for a work machine, the system comprising:
   a frame;
   a ground-engaging mechanism coupled to the frame;
   an attachment coupled to the frame;
   an object detector coupled to the frame and configured to detect an object around the work machine;
   a multiple mode control system including a control device and a controller receiving an input signal from the control device, the controller having a first operational mode and a second operational mode, the first operational mode enabling a first sensitivity response to the control device and the second operational mode enabling a second sensitivity response to the control device,
   the controller configured to receive an object signal from the object detector and modify an operational mode of the controller based on a detected distance of the detected object from a reference point;
   a power source; and
   a power conversion system driven by the power source to power one or more of the ground-engaging mechanism for moving the frame, and the attachment,
   wherein the operational mode is altered by the controller by modifying the power conversion system from a first power-to-torque ratio to a second power-to-torque ratio.

2. The multiple mode operational system of claim 1, wherein the control device comprises one or more of a joystick, a foot pedal, a touchscreen, and a steering wheel.

3. The multiple mode operational system of claim 1 further comprising: a valve in fluid communication with a plurality of hydraulic actuators coupled to the ground-engaging mechanism; a pump configured to discharge fluid to the valve; wherein the operational mode is altered by the controller by modifying a margin pressure value, the pump discharging fluid to the valve based on a current margin pressure value and an input signal from the control device.

4. The multiple mode operational system of claim 1, further comprising: a valve in fluid communication with a plurality of hydraulic actuators coupled to the attachment to move the attachment from a first position to a second position; a pump configured to discharge fluid to the valve; wherein the operational mode is altered by the controller by modifying a margin pressure value, the pump discharging fluid to the valve based on the margin pressure value and an input signal from the control device.

5. The multiple mode operational system of claim 1 further comprising:
   a display supported on the frame and configured to output an image based on the object signal from the object detector, wherein the object detector comprises an image capturing system.

6. The multiple mode operational system of claim 1 further comprising:
   a light sensor configured to differentiate between sunlight and artificial light, the controller configured to receive a light signal from the light sensor and modify the operational mode of the controller based on the light signal from the light sensor.

7. The multiple mode operational system of claim 1, wherein a controller alters the operational mode based on a threshold distance of the detected object from the reference point.

8. The multiple mode operation system of claim 7, wherein the threshold distance of the detected object from the object detector may be modified based on the operational mode.

9. The multiple mode operation system of claim 1, further comprising an alert signal activated upon detection of the object within a threshold distance, wherein the threshold distance is modified based on operational mode.

10. A method for dynamically shifting an operational mode for a work machine, the method comprising:
    receiving an object signal from an object detector, the object detector configured to detect an object around the work machine;
    receiving an input signal from a control device;
    determining with a controller, a detected distance of a detected object from a reference point based on the object signal;
    modifying an operational mode by the controller based on the detected distance of the detected object, the controller having a first operational mode and a second operational mode, the first operational mode enabling a first sensitivity response to the input signal from the control device and the second operational mode having a second sensitivity response to the input signal from the control device;
    receiving a first power-to-torque ratio on a power conversion system by the controller; and
    modifying the power conversion system to a second power-to-torque ratio based on the operational mode,
    wherein the power conversion system is driven by a power source to power one or more of a ground-engaging mechanism for moving a frame of the work machine and an attachment coupled to the work machine.

11. The method of claim 10, wherein the control device comprises one or more of a joystick, a foot pedal, a touchscreen, and a steering wheel.

12. The method of claim 10 further comprising:
    receiving a current margin pressure value by the controller;
    modifying a margin pressure value by discharging fluid by a pump to a valve in fluid communication with a plurality of hydraulic actuators coupled to a ground-engaging mechanism of the work machine based on the operational mode.

13. The method of claim 10 further comprising:
    receiving a current margin pressure value by the controller;
    modifying a margin pressure value by discharging fluid by a pump to a valve in fluid communication with a plurality of hydraulic actuators coupled to an attachment to move the attachment from a first position to a second position, the attachment coupled to the work machine, based on the operational mode.

14. The method of claim 10 further comprising:
    outputting an image onto a display by the controller, based on the object signal from the object detector, the object detector comprising an image capturing system.

15. The method of claim 10 further comprising:
    receiving a light signal from a light sensor; and
    modifying the operational mode based on the light signal from the light sensor.

16. The method of claim 10, wherein a controller modifies the operational mode based on a threshold distance of the detected object from the reference point.

17. The method of claim 10, wherein a threshold distance of the detected object from the object detector may be modified based on the operational mode.

\* \* \* \* \*